Dec. 9, 1958 S. RADFORD 2,863,259
FLOWER POT
Filed Nov. 5, 1953
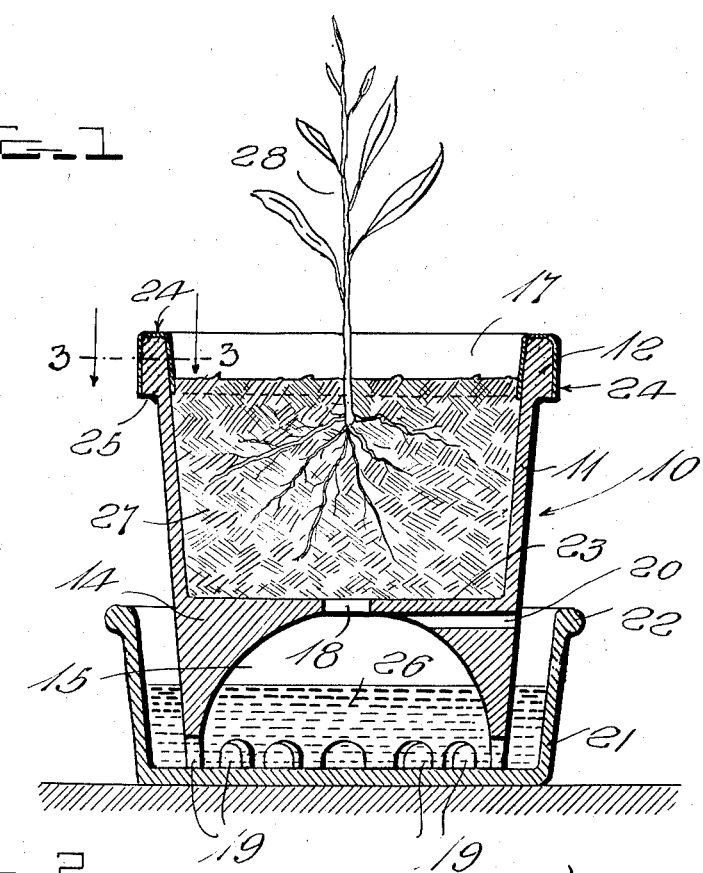
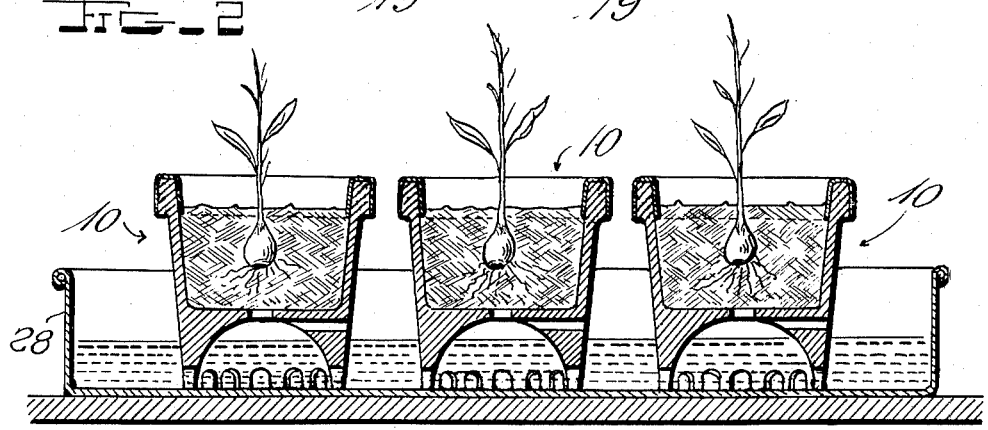
INVENTOR
STEPHEN RADFORD,
BY Felix A. Russell
ATTORNEY United States Patent Office 2,863,259
Patented Dec. 9, 1958

2,863,259

FLOWER POT

Stephen Radford, Washington, D. C.

Application November 5, 1953, Serial No. 390,361

1 Claim. (Cl. 47—38)

The present invention relates to a flower pot and it consists in the combinations, constructions and arrangements of parts herein described and claimed.

Generally there is provided a flower pot having the conventional outward appearance, that is to say, having a cylindrically shaped rim at its upper end and having downwardly and inwardly tapering rounded sides. The device is, however, provided with a relatively thick bottom provided with a large semi-spherical opening extending from the lower end of the pot upwardly to a point adjacent the upper face of the bottom. The curvular side of such semi-spherical opening is presented upwardly and a drain passage centrally interconnects the same with the interior of the pot proper. A series of circumferentially spaced water inlet openings is provided in the side walls of the pot at the lower end of the semi-spherical opening and a lateral vent is provided through the thickened bottom of the pot to communicate with the upper end portion of the semi-spherical opening. The pot is mounted in a pan whose upper edge lies immediately below the upper face of the thickened bottom and the device is such that water placed in the pan is fed through the inlet openings to the interior of the semi-spherical opening, the vent providing an escape means for air which would otherwise be entrapped in such semi-spherical opening, and the side walls of the thickened bottom provide a means for carrying water to the soil contained in such pot through capillary action. The upper edge of the pot and the inner and outer faces of the rim portion thereof are provided with a layer of glazed material. The device is such that a constant supply of moisture is provided for the soil contained in the pot while at no time allowing excessive moisture to be fed thereto.

It is accordingly an object of the invention to provide a device of the character set forth which is simple in construction, inexpensive to manufacture and yet effective and efficient in use.

Another object of the invention is to provide, in a device of the character set forth, a soil-containing chamber and novel means for feeding moisture thereto.

Another object of the invention is to provide, in a device of the character set forth, a novel water-impervious upper portion for a flower pot.

Still another object of the invention is to provide, in a device of the character set forth, a novel thickened bottom having a water reservoir therein and provided with novel water inlet openings and an air vent, all forming parts of the invention.

Other and further objects of the invention will become apparent from a reading of the following specification taken in conjunction with the drawing in which:

Figure 1 is a vertical sectional view of an embodiment of the invention,

Figure 2 is a view similiar to Figure 1 but somewhat reduced and illustrating the use of the device in multiple units, and Figure 3 is an enlarged fragmentary sectional view taken along line 3—3 of Figure 1.

Referring more particularly to the drawing, there is shown therein a device of the character set forth comprising a pot generally indicated at 10 and provided with inwardly and downwardly tapering side walls 11 and an integrally formed generally cylindrical lip 12. The pot 10 is provided with a relatively thick bottom wall 14 having a semi-spherical opening 15 formed therein with its curvular surface presented upwardly. The upper end of the opening 15 is centrally connected with the lower end of a soil receiving chamber 17 by means of a passage 18.

A series of circumferentially spaced water inlet openings 19 extends from the lower portion of the semi-spherical opening 15 radially outwardly therefrom to communicate with the exterior of the pot 10 and a horizontally extending air vent opening 20 extends from the upper portion of the opening 15 radially outwardly therefrom in the bottom wall 14 to communicate with the outer side of the pot 10.

A pan 21 is provided with a lip 22 whose upper edge preferably and as shown lies below the bottom 23 of the soil chamber 17. The pot 10 is formed of clay which may be of any suitable type but which is mixed with a quantity of small combustible particles such as coke dust, which upon firing will leave minute spaces in the finished product thereby providing greater porosity for the same. The pot 10, after firing, is immersed in any type of soluble fertilizer and the interior of the soil chamber 17 is dusted with any suitable type of powdered fertilizer prior to use. Fertilizer may also be added to the mix from which the pot is made.

The inner and outer sides of the lip 12 together with its upper edge are glazed, as indicated at 24, to prevent moisture in the walls of the pot 10 from proceeding upwardly beyond a shoulder 25 formed by the lip 12 with the walls of the pot.

In operation, it will be apparent that the pot 10 may be centrally disposed in the pan 21 which may thereupon be filled with water, indicated at 26. The water will thereupon flow from the pan 21 into the semi-spherical opening 15 through the inlet openings 19 and air displaced thereby will pass out the vent opening 20 to the atmosphere. Water will now be raised upwardly through the substance of the pot through capillary action and will spread through the constantly thickening walls of the bottom 14 and thence into the walls of the soil chamber 17 from which it will feed directly to soil 27 placed in the chamber 17 to thereby provide the roots of a plant 28 in such soil with a constant and proper supply of moisture without causing such soil to become oversaturated with water. Since the lip 22 lies below the bottom 23 of the chamber 17, the level of the water 26 may at no time be above such bottom 23 and hence there is no danger of flooding or partially flooding the chamber 17.

As water proceeds from the pan 21 to the soil 27 as above set forth, it will be apparent that it will dissolve and carry the fertilizer contained in the substance of the pot 10 to the soil. It will also allow a direct feeding of fertilizer previously dusted upon the interior of the chamber to the soil 27.

In the form of the invention illustrated in Figure 2, instead of individual pans 21 for each pot 10, a plurality of pots 10 may be placed in an elongated pan 28 which may be supplied with water at a constant and proper level, by any suitable means such as a float controlled valve (not shown), the operation and construction of the individual pots being the same as above-described.

While but two forms of the invention have been shown and described herein, it will be readily apparent to those skilled in the art that many minor modifications may be made without departing from the spirit of the invention or the scope of the appended claim.

What is claimed is:

A device of the character described comprising a pot formed of porous material and having a relatively thick bottom, an integrally formed upwardly extending circular wall defining with said bottom a soil-receiving chamber, said bottom having an upwardly extending relatively large substantially semi-spherical opening therein defining a solid bottom wall of upwardly increasing thickness, said bottom wall having a plurality of circumferentially spaced water inlet openings extending radially through said bottom wall at the lower end of said relatively large opening, said bottom wall having an air vent extending radially therethrough at the upper end portion of said relatively large opening in juxtaposition to the bottom of said soil-receiving chamber, whereby said bottom wall is adapted to transmit moisture by capillary action from its lower edge portion substantially uniformly to the bottom and sides of said soil-receiving chamber, a substantially cylindrical lip formed integrally with the upper end of said pot, and a coating of water-impervious glaze material upon the sides and upper edge of said lip.

References Cited in the file of this patent

UNITED STATES PATENTS

| | | |
|---|---|---|
| 1,226,311 | Clifford | May 15, 1917 |
| 1,631,802 | Evert | June 7, 1927 |
| 1,953,363 | Pavlecka | Apr. 3, 1934 |
| 2,130,234 | Haglund | Sept. 13, 1938 |
| 2,238,132 | Ritter | Apr. 15, 1941 |

FOREIGN PATENTS

| | | |
|---|---|---|
| 54,894 | Germany | Jan. 12, 1891 |
| 15,061 | Great Britain | July 24, 1901 |
| 103,027 | Great Britain | Jan. 11, 1917 |